July 6, 1965        R. P. THORN        3,193,236
                    DAMPED CHASSIS
Filed Feb. 12, 1962                    2 Sheets-Sheet 1
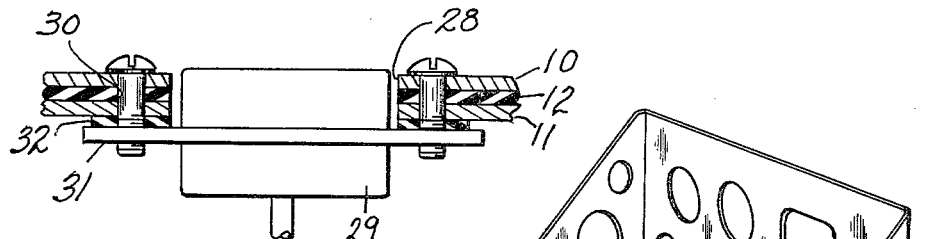
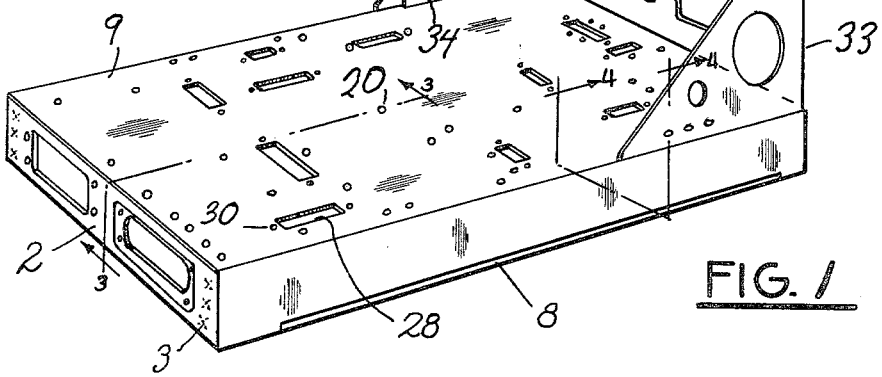
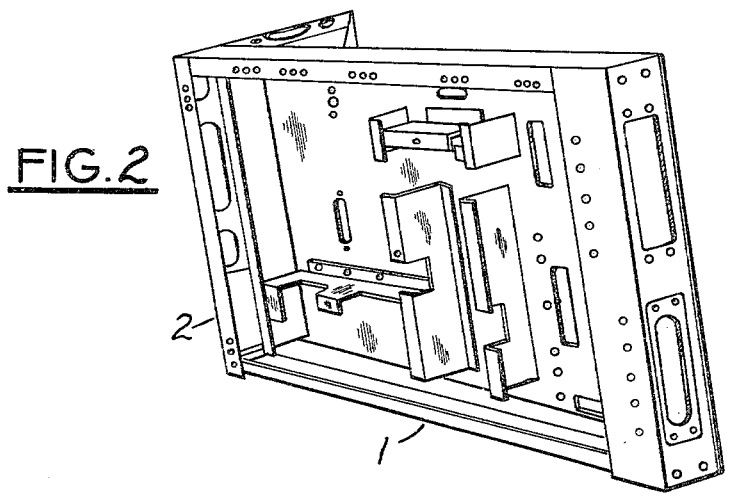
INVENTOR.
BY Richard P Thorn
Ralph Hammar
Attorney

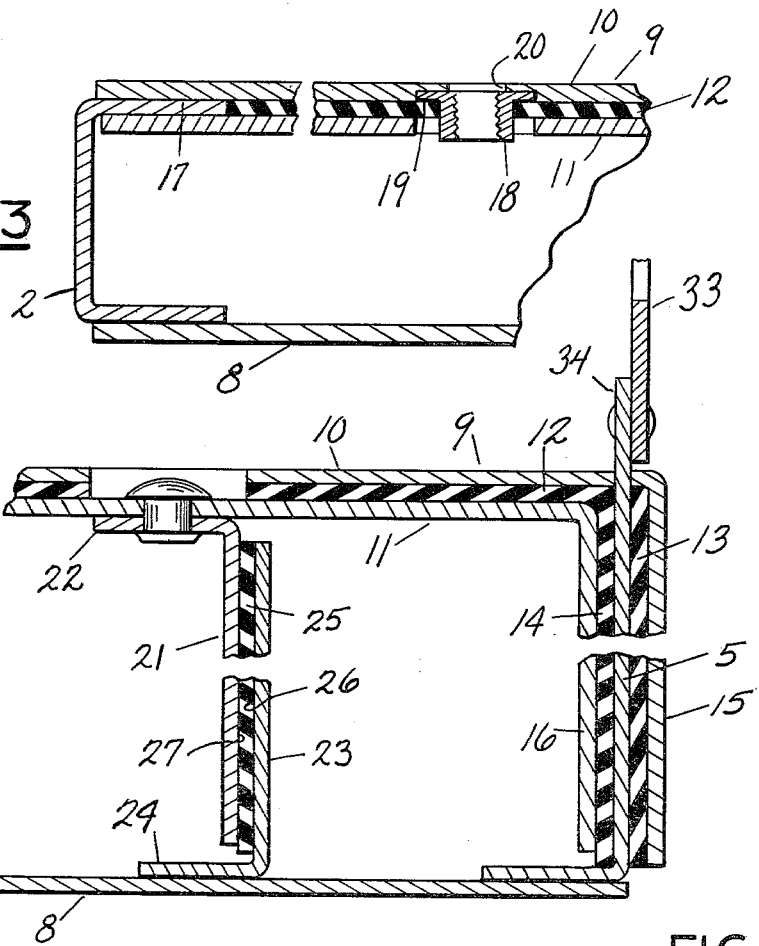
FIG. 3
FIG. 4
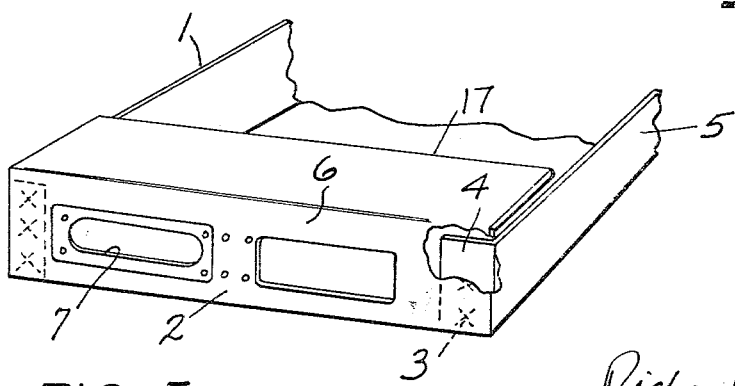
FIG. 5
INVENTOR.
Richard P. Thorn
BY Ralph Hammar
Attorney 3,193,236
DAMPED CHASSIS
Richard P. Thorn, Erie Pa., assignor to Lord Manufacturing Company, Erie, Pa., a corporation of Pennsylvania
Filed Feb. 12, 1962, Ser. No. 172,441
8 Claims. (Cl. 248—358)

This invention is a chassis having built in damping for protecting equipment mounted thereon from vibration and shock.

In the drawing, FIGS. 1 and 2 are top and bottom perspectives of the chassis, FIG. 3 is a fragmentary section on line 3—3 of FIG. 1, FIG. 4 is a fragmentary section on line 4—4 of FIG. 1, FIG. 5 is a partial perspective of the structural members of the base, and FIG. 6 is a fragmentary view of one of the connectors mounted on the base.

The chassis has a rigid frame by which the chassis is mounted on the supporting structure. The frame may, for example, consist of longitudinal angle sections or side rails 1 and cross channels 2. These are rigidly joined, for example, by spot welds 3 connecting a tab 4 on the vertical flange 5 of each angle section to the web 6 of the channels. When the equipment mounted on the chassis is to be air cooled, the web 6 may be provided with duct openings 7 and the bottom of the frame may be closed by a plate 8. The structure so far described has the required rigidity for attachment to a supporting structure. However, equipment mounted directly on the frame would be subject to damage by high frequency vibration.

Protection from high frequency vibration is provided by mounting the equipment on a damped top plate 9 consisting of upper and lower metal sheets or plates 10 and 11 bonded to an intervening layer 12 of viscoelastic material characterized by high internal damping or friction and a low modulus of elasticity compared to the upper and lower plates 10 and 11. Instead of the three ply laminate illustrated, the plate 9 could be any multiply damped laminate or it could have a cellular center section as required by strength, frequency and attachment details. At opposite sides there are two viscoelastic layers 13 and 14. The viscoelastic layer 13 is between an integral depending flange 15 on the top plate 10 and the outside of the vertical flange 5 of the angle section 1. The layer 14 is between an integral depending flange 16 on the bottom plate 11 and the inside of the vertical flange 5 of the angle 1. From one aspect, there is a single sandwich at the top of the plate 9 consisting of the plates 10 and 11 and the intervening viscoelastic layer 12, whereas at the sides of the plate 11 there is a double sandwich consisting of the flanges 5, 15 and 16 and the viscoelastic layers 13 and 14. The double sandwich construction at the sides provides a high degree of damping for gross modes and controls the stiffness or the fundamental natural frequency for the entire assembly. In gross modes of vibration the entire structure vibrates as a unit as distinguished from modes of vibration in which adjacent parts of the structure vibrate in different directions.

At opposite ends, the upper flanges 17 of the channels 2 extend between and are rigidly fixed to the upper and lower plates 10 and 11. This results in a solid box frame construction.

The equipment mounted on the chassis is connected only to the top skin or plate 10. This is the most efficient arrangement. However, attachment could be made to both skins or many skins as in a multiply laminate. The connection to the top plate is made through nuts 18 secured to the top plate, for example by brazing a flange 19 to the under side of the plate. The nuts 18 register with holes 20 in the top plate 10 and are distributed throughout the top plate in accordance with the requirements of the equipment to be mounted. With this mounting construction, at low frequencies, the top and bottom plates deflect together and the stiffness of the combined structure is many times the stiffness of the individual plates 10 and 11. For example, the stiffness may be as much as fifteen or more times the stiffness of the individual plates. At higher frequencies, the plates 10 and 11 move relative to each other and the effective stiffness of the structure approaches the stiffness of the top plate 10. This provides control of the amplitudes of local structural resonances by shearing action between the top and bottom plates. For higher frequencies the decoupling of the top and bottom plates provides attenuation or in effect a distributed isolator for the reduction of vibratory levels.

On the under side of the laminated top panel 9 are a plurality of reinforcing members each comprising an angle section 21 with a flange 22 riveted or otherwise secured to the bottom plate 11 and an angle section 23 with a flange 24 to be secured to the bottom cover plate 8. There is a viscoelastic layer 25 sandwiched between and bonded to the opposed surfaces 26 and 27 of the angle sections 21 and 23. These sections increase the load carrying capacity of the laminated top member 9 and also assist in the damping. If the sections 21, 23 were solidly connected, the modes of vibration of the top panel would be restrained and at high frequencies the damping would be markedly inferior.

Throughout the top plate there are disposed a plurality of openings 28 for receiving connectors 29. These openings extend through both the top and bottom plates 10 and 11 and the connectors are secured to the inner side of the plate 11 by screws extending through holes 30 into the usual flange 31 on the connector which surrounds the under side of the opening 28. Since air tight mounting of the connectors is usually required, suitable gaskets may be arranged between the connector flange and the plate 11 and it is possible to provide the gasket material by bonding a rim 32 of viscoelastic material to the under side of the plate 11 around the associated opening 28.

If required, a control panel 33 for the equipment mounted on the base may be attached to the base, for example, by riveting to ears 34 integral with the upper edge flanges 5 of angles 1 as shown in FIGS. 1 and 4.

What is claimed as new is:

1. A chassis comprising a frame having spaced side rails, a top panel extending between the upper edges of the rails, and said panel comprising upper and lower sheets and a viscoelastic layer between and bonded to the sheets, the lower sheet having depending flanges overlapping the inner sides of the rails, the upper sheet having depending flanges overlapping the outer sides of the rails, viscoelastic layers between and bonded to the inner and outer sides of the rails and the adjacent flanges, said viscoelastic layers being characterized by high internal friction and low modulus of elasticity compared to the sheets and rails.

2. A chassis comprising a frame having spaced side rails and end members connecting the rails, a top panel extending between the upper edges of the rails, said panel comprising upper and lower sheets, flanges on the end members extending between and fastened to the upper and lower sheets, a viscoelastic layer between and bonded to the sheets, the lower sheet having depending flanges overlapping the inner sides of the rails, the upper sheet having depending flanges overlapping the outer sides of the rails, viscoelastic layers between and bonded to the inner and outer sides of the rails and the adjacent flanges, said viscoelastic layers being characterized by high internal friction and low modulus of elasticity compared to the sheets and rails.

3. A chassis comprising a frame having spaced side rails and end members connecting the rails, a top panel extending between the upper edges of the rails, said panel comprising upper and lower sheets, flanges on the end members extending between and fastened to the upper and lower sheets, a viscoelastic layer between and bonded to the sheets, the lower sheet having depending flanges overlapping the inner sides of the rails, the upper sheet having depending flanges overlapping the outer sides of the rails, viscoelastic layers between and bonded to the inner and outer sides of the rails and the adjacent flanges, said viscoelastic layers being characterized by high internal friction and low modulus of elasticity compared to the sheets and rails and means connected to one of said sheets for mounting equipment on the chassis.

4. A chassis comprising a frame having spaced side rails, joined by cross members having flanges extending between the rails, a top panel extending between the upper edges of the rails, said panel comprising upper and lower sheets and a viscoelastic layer between and bonded to the sheets, the flanges extending between and solidly secured to the sheets, the lower sheet having depending flanges overlapping the inner sides of the rails, the upper sheet having depending flanges overlapping the outer sides of the rails, viscoelastic layers between and bonded to the inner and outer sides of the rails and the adjacent flanges, a bottom panel secured to the rails and cross members, and stiffening members extending between the top and bottom panels comprising a member connected to said lower sheet and another member connected to the bottom panel and an intervening layer of viscoelastic material connecting said members, said viscoelastic layers being characterized by high internal friction and low modulus of elasticity compared to the sheets, members and rails.

5. A chassis comprising a frame having spaced top and bottom panels, said top panel comprising upper and lower sheets and a viscoelastic layer between and bonded to the sheets, means for mounting equipment on the top panel, a stiffening member attached to the lower sheet of the top panel and having a flange extending toward the bottom panel, and another flange adjacent the first flange, said other flange being connected to said bottom panel and extending toward the top panel, and a viscoelastic layer bonded to said flanges, said viscoelastic layers being characterized by high internal friction and low modulus of elasticity compared to the sheets and flanges.

6. A chassis comprising a frame having members spaced from each other, a panel connected to and bridging the space between said members, said panel comprising upper and lower sheets, a viscoelastic layer between and bonded to the sheets, a flange transverse to and spaced from one of the sheets of the panel, another viscoelastic layer having one surface bonded to said flange, and means connecting the opposite surface of said last layer to said one sheet of the panel, said viscoelastic layers being characterized by high internal friction and low modulus of elasticity compared to the sheets and flange.

7. A chassis comprising a frame having spaced side rails with spaced upper edges and end members connecting the ends of the rails, a top panel extending between the upper edges of the rails, said panel comprising upper and lower sheets, flanges on the end members extending between and fastened to the upper and lower sheets, a viscoelastic layer between and bonded to the sheets, said viscoelastic layer being characterized by high internal friction and low modulus of elasticity compared to the sheets and rails.

8. A chassis comprising a frame having spaced side rails, a top panel connected to the side rails and extending between the upper edges of the rails, said top panel comprising upper and lower sheets and a viscoelastic layer between and bonded to the sheets, a bottom panel spaced below the top panel and connected to the frame, and stiffening members extending between the top and bottom panels comprising a member connected to said lower sheet and another member connected to the bottom panel and an intervening layer of viscoelastic material connecting said members, said viscoelastic layers being characterized by high internal friction and low modulus of elasticity compared to the sheets and members.

References Cited by the Examiner

UNITED STATES PATENTS

| | | | |
|---|---|---|---|
| 2,138,175 | 11/38 | Keys | 248—10 |
| 2,514,246 | 7/50 | Knox | 317—101 |
| 2,557,610 | 6/51 | Meyers | 248—21 |
| 3,007,997 | 11/61 | Panariti | 174—68.5 |
| 3,071,217 | 1/63 | Gould | 248—22 |
| 3,078,971 | 2/63 | Wallerstein | 248—358 X |
| 3,079,277 | 2/63 | Painter | 248—358 X |

FOREIGN PATENTS 691,064  5/40  Germany.

CLAUDE A. LE ROY, *Primary Examiner.*

FRANK L. ABBOTT, *Examiner.*